United States Patent [19]

Frederich

[11] Patent Number: 4,768,030
[45] Date of Patent: Aug. 30, 1988

[54] SWITCH INTERFACE METHOD AND APPARATUS

[75] Inventor: William L. Frederich, Kenosha, Wis.

[73] Assignee: Eaton Corporation, Cleveland, Ohio

[21] Appl. No.: 931,316

[22] Filed: Nov. 17, 1986

[51] Int. Cl.<sup>4</sup> ............ H04Q 9/00; H04Q 1/39; H04J 3/06
[52] U.S. Cl. .................. 340/825.06; 340/518; 340/825.100; 340/825.570; 370/48
[58] Field of Search ............ 340/825.06, 825.08, 340/518, 825.57, 825.1, 825.11; 370/112, 53, 48, 60, 105

[56] References Cited

U.S. PATENT DOCUMENTS

| | | |
|---|---|---|
| 3,149,320 | 9/1964 | Devine . |
| 3,266,030 | 8/1966 | Sadler . |
| 3,384,714 | 5/1968 | Weld et al. . |
| 3,462,756 | 8/1969 | Mills . |
| 4,005,399 | 1/1977 | Pazemenas ............... 340/310 R |
| 4,203,096 | 5/1980 | Farley et al. ............... 340/538 |
| 4,310,922 | 1/1982 | Lichtenberger ............... 370/48 |
| 4,409,590 | 10/1983 | Baker ............... 340/533 |
| 4,413,336 | 11/1983 | Chaillie et al. ............... 370/48 |
| 4,627,047 | 12/1986 | Pitroda et al. ............... 370/58 |
| 4,642,629 | 2/1987 | Milligan ............... 340/825.57 |
| 4,680,759 | 7/1987 | Miller et al. ............... 370/112 |
| 4,719,461 | 1/1988 | Keller ............... 340/825.57 |

FOREIGN PATENT DOCUMENTS

| | | |
|---|---|---|
| 1097529 | 1/1968 | United Kingdom . |
| 1435949 | 5/1976 | United Kingdom . |
| 1528457 | 10/1978 | United Kingdom . |

OTHER PUBLICATIONS

GB 2054225A, J. William McNamee, et al., Feb. 1981.

Primary Examiner—Donald J. Yusko
Attorney, Agent, or Firm—M. L. Union

[57] ABSTRACT

An interface for generating a serial bit stream corresponding to one or more switch settings and transmitting that bit stream to a polling circuit. Four parallel bits representing a setting of a decimal switch are converted to serial bit sequence. This sequence is preceded by a start bit and followed by an extended stop bit. In an embodiment where multiple switches are polled, the data sequence is followed by a switch designating sequence and then the extended stop bit.

4 Claims, 2 Drawing Sheets

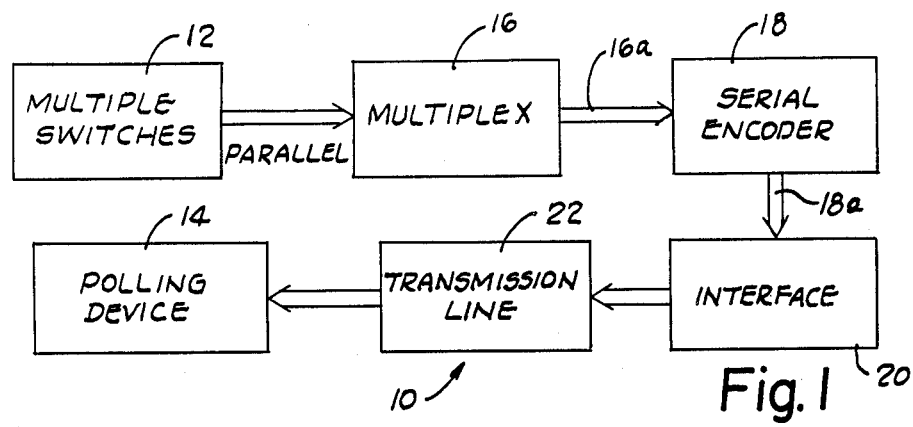
Fig. 1
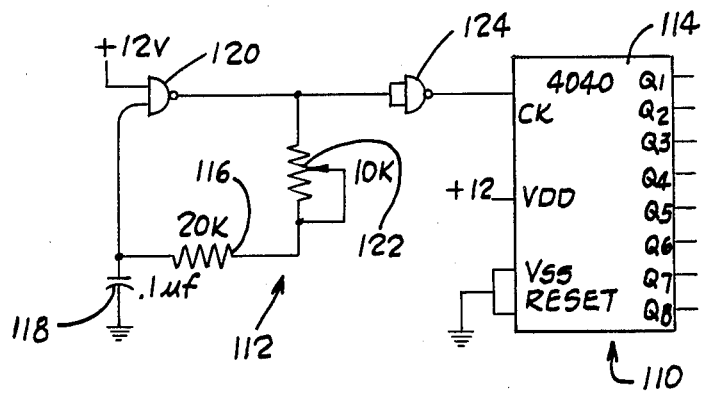
Fig. 3
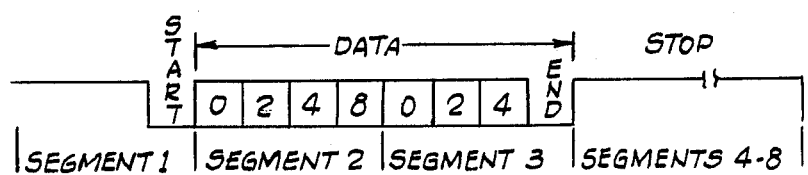
Fig. 4
Fig. 5

SWITCH INTERFACE METHOD AND APPARATUS

DESCRIPTION

TECHNICAL FIELD

The present invention concerns a switch interface that responds to a switch setting by creating a serial communications signal corresponding to that setting.

BACKGROUND ART

In many situations it is necessary for a circuit to poll a switch to determine the status or setting of that switch. For a simple on/off type switch a single serial communications line can be used. When the switch becomes more complex, however, the polling circuit may need to determine the status of a number of signals coming from the switch.

In one prior art system, multiple thumbwheel switch settings are interpreted by a control system that utilizes the setting of those switches to perform a calculation. Each thumbwheel switch produces a four bit output to indicate a switch setting from zero to nine. If multiple digits and therefore multiple switches are required a multiple of these four bits must be transmitted to the control system. If these signals are transmitted in parallel a large number of circuit interconnections are needed. This increases wiring complexity and also requires increased data transmission capability.

DISCLOSURE OF THE INVENTION

A switch interface in accordance with the present invention multiplexes data from one or more switches to a single transmission line in a serial format. Power to implement this switch interface is transmitted from a polling device or circuit so that a separate power supply for the interface is not necessary.

The switch interface apparatus of the invention includes a multiplex circuit connected to one or more switches to convert a digital output from those switches to a serial communications signal. The multiplex circuit generates a binary data sequence at a transfer rate controlled by a timing circuit. Data is transferred from the interface along a serial transfer path to a polling device.

An interface control circuit coupled to the timing circuit initiates a data transfer with a start bit, followed by a binary data sequence that includes an end of data bit, followed by an extended stop bit that begins a specified number of bits after the start bit.

The timing circuit of the invention is a freerunning oscillator that is powered by a low voltage signal from the polling device. The control unit receives clock signals from the oscillator and generates control signals that control the output of a data sequence from the multiplex circuit.

The polling device includes an RS-232 communications or equivalent circuit for monitoring the serial data from the multiplex unit. The RS-232 circuit monitors the serial data transmission and is coupled to a programmable controller that analyzes the serial data based upon a serial communications protocol.

In an application where the status of multiple switches is monitored, subsequent to the switch setting data, a switch designator is generated by the interface so that the polling circuit can group together the switch setting data with a specified switch. Four bits are needed to designate the switch setting and an additional number of other bits are needed to designate which of the multiple switches that data describes.

The use of an extended stop bit allows the polling device to check data received from the switch interface. If the polling device begins interpreting data in the middle of that data, when the polling device expects to encounter the end of data bit it will instead receive one bit of the extended stop bit. The polling device then ignores the data that is received and begins data interpretation on the next succeeding low (start) bit.

From the above it is appreciated that one object of the invention is a switch interface for determining the status of one or more switch settings and for generating a serial bit sequence based upon those switch settings. This and other objects, advantages and features of the invention will become understood from the detailed description of a preferred embodiment of the invention when considered in conjunction with the accompanying drawings.

BRIEF DESCRIPTION OF THE DRAWINGS

FIG. 1 is a schematic representation of a communications system using the present invention;

FIG. 3 is a schematic showing an oscillator and control circuit for generating control outputs to the multiplex circuitry of FIG. 2;

FIG. 4 is a schematic of an interface between an output from the FIG. 2 circuitry and a data transmission line; and FIG. 5 is a representative bit sequence showing the relation of a start, data, and stop segment to the bit sequence.

BEST MODE FOR CARRING OUT THE INVENTION

Figure 2:
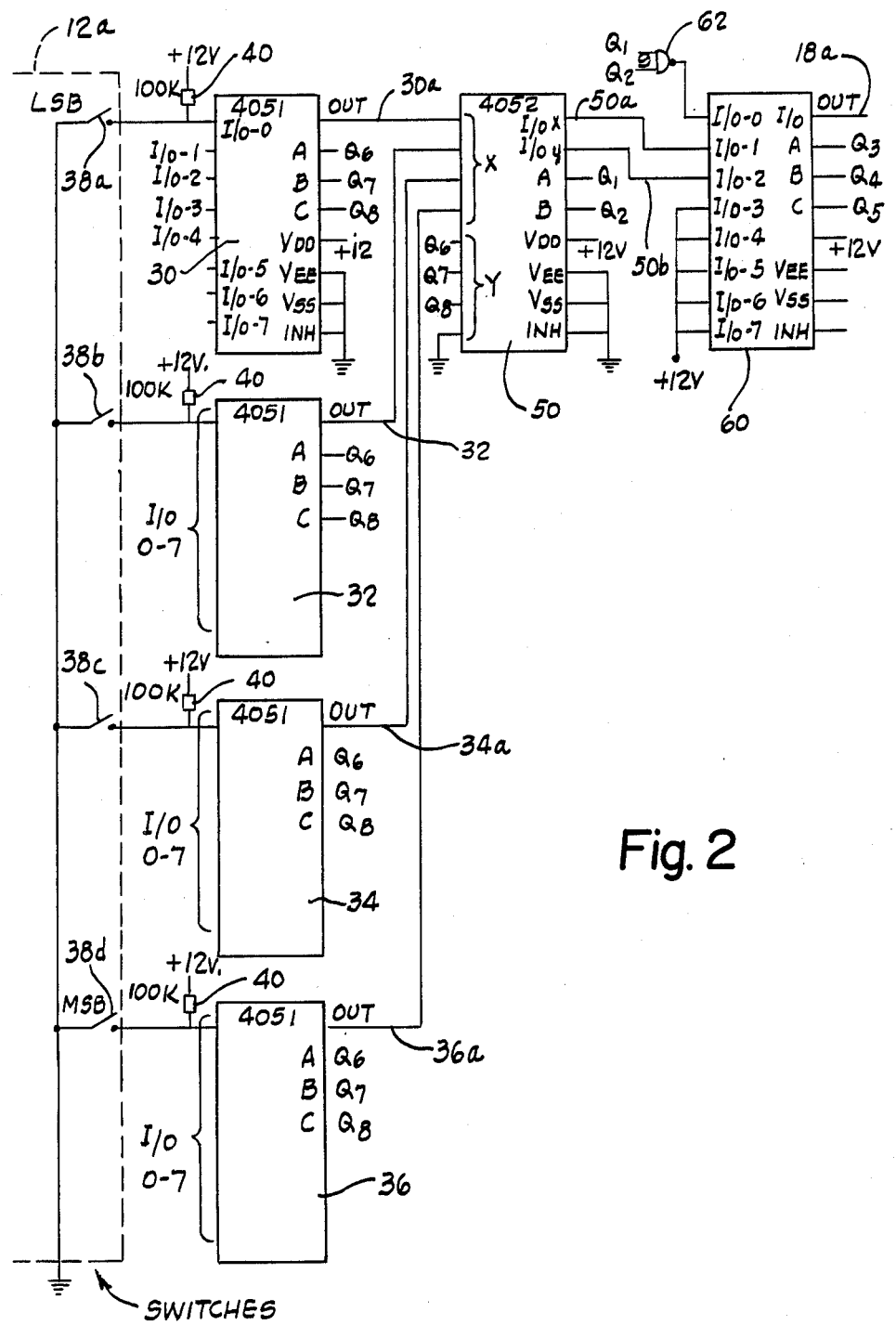
FIG. 2 is a more detailed schematic showing a plurality of switch contacts coupled to multiplex circuitry for converting parallel data into a serial bit sequence.

Turning now to the drawings, a communications system 10 embodying the invention includes a plurality of switches 12 that allow a user to instruct or interact with a polling device 14. The multiple switches 12 are used for sending data to the polling device 14 and may, for example, constitute a mechanism for transmitting variable data to a system that utilizes that data in calculations. More specifically, the multiple switches 12 may comprise thumbwheel switches arranged on a user interface and the polling device 14 may comprise a programmable controller for controlling the operation of a manufacturing process or system. Numerous other examples of a suitable system 10 having switch inputs and a polling device 14 for polling those inputs and utilizing the settings of the switches to perform data processing are well known.

In a system having multiple thumbwheel switches, each thumbwheel switch represents a decimal input that can be representated with a four bit data sequence. Depending on the resolution required by the system, multiple thumbwheel switches can be arranged on an interface panel in such a way that multiple decimal settings are possible.

A multiplex unit 16 (FIG. 1) is coupled to the switches 12. In a system having mutliple switches, the multiplex unit 16 selectively transmits a set of four parallel signals from one of the multiple switches 12. By way of example, in one application of the invention, six thumbwheel switches are coupled to the multiplex unit 16 and a four line parallel output 16a corresponding to the setting of a single one of those thumbwheel switches is output from the multiplex unit 16.

A serial encoder unit 18 converts the parallel data from the multiplex unit 16 into a serial bit stream or sequence at an output 18a. The serial data at the output 18a is transmitted by an interface 20 to a transmission line 22 and then to the polling device 14. The interface 20 comprises a line driver that responds to the serial data from the encoder 18 and creates a signal suitable for data transmission on the transmission line 22.

A preferred multiplex unit 16 and serial encoder 18 are continuously operating. So long as the multiplex unit and encoder 18 are powered, the switch settings are sequentially monitored and a serial bit stream for each switch is generated. In this way, whenever the polling device 14, such as a programmable controller, wishes to access the switch settings, it need merely monitor the data on the transmission line 22 and determine those settings. A regularly generated interrupt, could for example, cause the polling device 14 to monitor the data on the transmission line 22 to determine the settings of the switches 12.

Turning now to FIG. 2, a plurality of multiplex circuits 30, 32, 34, 36 are shown configured in parallel to monitor switch settings from the mutliple switches 12. A representative one of those switches 12a is depicted in FIG. 2 as having four switch contacts 38a-38d. A least significant bit of the four bits needed to represent the decimal output of the switch 12a is controlled by a first contact 38a and a most significant bit of the four contacts is generated by the fourth contact 38d. Outputs from the contacts 38a-38d are coupled to a corresponding one of the multiplex circuits 30, 32, 34, 36. Each of the switch contacts 38a-38d selectively grounds an input to its associated multiplex circuit. With the least significant bit contact 38a open a corresponding input (I/O-0) on the multiplex unit 30 is maintained high by a twelve volt source coupled to that input through a pull up resistor 40. If the least significant bit contact 38a is closed, however, the multiplex circuit input is grounded.

In an application where thumbwheel switches are utilized, the decimal setting of the switch dictates the status of tbe four contacts comprising that switch. By rotating the thumbwheel switch a user automatically determines the setting of the contacts 38a-38d. The multiplex circuits 30, 32, 34, 36 can handle up to eight inputs. Four of these multiplex circuits in parallel can therefore convert signals appearing at 32 parallel inputs into four outputs 30a, 32a, 34a, 36a coupled to an additional multiplex circuit 50.

The status of three controlling inputs designated A, B, C in FIG. 2 determine which of the eight inputs of a multiplex circuit are coupled to that circuit's output. These three control inputs are the same on each of the four multiplex circuits 30, 32, 34, 36 so that the multiplex circuits simultaneously transmits four bits from a given switch to the second multiplex circuit 50.

The second multiplex circuit 50 has eight inputs. In the application presented, these eight inputs are arranged in two groups (X, Y) of four inputs each. The control inputs A, B of the multiplex circuit 50 selectively controls data transmission from the eight inputs to one of two outputs 50a, 50b. Switch data from the multiplex circuits 30, 32, 34, 36 appearing at a first group of four inputs designated group X is output at a first output 50a and an input selected from the group designated Y in FIG. 2 is output at a second output 50b.

Which of the four inputs from a particular group (X or Y) is presented at the out is dictated by the status at the two control inputs A, B of the multiplex circuit 50.

The FIG. 2 schematic includes one additional multiplex circuit 60. This multiplex circuit has eight inputs (I/O-0-I/O-7) and a single output 18a. Three control inputs designated A, B, C control which of the eight inputs are coupled to the output 18a. A first input to the multiplex circuit 60 is generated by a NAND gate 62 having two inputs designated Q1, Q2. A second input to the multiplex circuit 60 is coupled to the output 50a of the multiplex circuit 50. This output carries switch data from the four switch contacts 38a-38d. A third input to the multiplex circuit 60 is coupled to the output 50b from the multiplex circuit 50. This output carries digital data from the second input grouping Y of the multiplex circuit 50. The output 18a from the multiplex circuit 60 comprises a serial data stream having data chosen from one of the eight inputs to the circuit 60.

A control circuit 110 (FIG. 3) includes an oscillator circuit 112 coupled to the input of a counter circuit 114. The oscillator 112 includes a resistor 116 and capacitor 118 coupled to a NAND gate 120. The capacitor 118 charges through the combination of the resistor 116 and a variable resistor 122. On power up of the system, the capacitor 118 is discharged and therefore one of the inputs to the NAND gate 120 is low. This produces a high output from that gate 120 which initiates charging of the capacitor 118. When the capacitor reaches a threshold value, both inputs to the NAND gate 120 are high and the output goes low. This initiates a discharge of the capacitor 118 until a second threshold is reached and the NAND gate again changes state. The output from the NAND gate 120 is coupled to a second NAND gate 124 which buffers the oscillator 112 from the counter 114.

A clock input (CK) to the counter 114 receives the oscillating square wave output from the second NAND gate 124 and creates an eight bit parallel output with designations Q1, Q2, Q3, etc., through Q8. This eight bit output controls operation of the FIG. 2 multiplex circuits 30, 32, 34, 36, 50, 60. The least significant bit output of the counter 114 is designated Q1 and the most significant bit output is Q8. Thus, for every clock pulse of the oscillator 112 the output Q1 changes state. After 256 clock pulses the counter 114 has cycled through its outputs and returns to a configuration where all outputs are low (or zero).

Returning to FIG. 2, the control inputs A, B, C on the first multiplex circuits 30, 32, 34, 36 are coupled to the outputs Q6, Q7, Q8 from the counter 114. These are the three most significant bits from the counter 114 and are used as switch designaters. This is illustrated by Table 1 below wherein the switch codes at the outputs Q6, Q7, Q8 are tabulated.

TABLE 1

| Switch | SWITCH CODES | | |
|---|---|---|---|
| | Q6 | Q7 | Q8 |
| 1 | 0 | 0 | 0 |
| 2 | 1 | 0 | 0 |
| 3 | 0 | 1 | 0 |
| 4 | 1 | 1 | 0 |
| 5 | 0 | 0 | 1 |
| 6 | 1 | 0 | 1 |
| 7 | 0 | 1 | 1 |
| 8 | 1 | 1 | 1 |

The switch 12a might, for example, correspond to the first switch in Table 1 and therefore the bit pattern (all zeros) on outputs Q6, Q7, Q8 for this switch would be as indicated in Table 1. At the same time these switch indicator control outputs from the counter 114 are controlling the operation of the multiplex circuits 30, 32, 34, 36 these control outputs serve as inputs to the multiplex circuit 50. The control outputs Q6, Q7, and Q8 form three of the four inputs to the multiplex input group designated Y in FIG. 2. The fourth output to this input bank is always grounded and therefore this input is always low (or zero).

The next three lower significant bits from the counter 114 Q3, Q4, and Q5 are used to divide the data transmission from the multiplex unit 60 into 8 equal time segments for each of the switches designated at the outputs Q6, Q7, and Q8. These 8 time segments and the corresponding control outputs Q3-Q5 of the counter 114 are depicted in Table 2 below.

TABLE 2

| TIME SEGMENT | Q3 | Q4 | Q5 |
| --- | --- | --- | --- |
| 1 | 0 | 0 | 0 |
| 2 | 1 | 0 | 0 |
| 3 | 0 | 1 | 0 |
| 4 | 1 | 1 | 0 |
| 5 | 0 | 0 | 1 |
| 6 | 1 | 0 | 1 |
| 7 | 0 | 1 | 1 |
| 8 | 1 | 1 | 1 |

A first time segment corresponds to a configuration where the three outputs Q3, Q4, and Q5 are low. In this configuration the output 18a from the multiplexer 60 comes from the input (I/O-0) generated by the NAND gate 62. In the next time segment (see Table 2 above) the output 18a comes from the output 50a of the multiplex circuit 50. During the third time segment the output 18a comes from the second output 50b of the multiplex circuit 50. During the five subsequent time periods the output 18a is high since the five other inputs I/O-0-I/O-7 to the multiplex unit 60 are coupled to a twelve volt source.

The remaining two outputs Q1, Q2 from the counter 114 control which of the four inputs from input groups X, Y are coupled to the multiplex circuit 60 and also determine the output status of the NAND gate 62.

The data organization of FIG. 5 is now apparent from a review of this figure in combination with the time segments of Table 2. During the first time segment, the output status of the NAND gate 62 is coupled to the output 18a. During the second time segment the output 50a corresponding to the switch settings of a switch is transmitted to the output 18a. During the third segment, the inputs Q6, Q7, Q8 and a last grounded input corresponding to an end of data bit are transmitted through the output 18a. In all subsequent time segments (4-8) until a change is state of the switch codes of Table 1 occurs, a high output (extended stop bit) appears at the output 18a.

Those familiar with digital logic will appreciate that since the two signals Q1, Q2 are coupled to the inputs of the NAND gate 62 the output of that gate will correspond to a pattern of three high outputs followed by a single low output and this bit pattern is depicted as segment 1 in FIG. 5. Since the same inputs Q1, Q2 are used as control inputs on the multiplex circuit 50, during segment two (FIG. 5) the four inputs on the input bank X of the multiplex circuit 50 will be presented as signals on the output 50a. Similarly, the change of state of the control inputs Q1, Q2 will cycle through the input group Y of the multiplex circuit 50 to generate the bit pattern of time segment three in FIG. 5. The end of data bit (low) is generated by the grounded input of the input group Y.

It is appreciated that the FIG. 5 bit stream is repeated for each of the switches comprising the multiple switch arrangement 12. Since the oscillator 112 is free running, the output 18a will cycle through the data depicted in FIG. 5 for each of the switches included in the system. The use of multiplex circuits 30, 32, 34, 36 having eight inputs indicates that the disclosed embodiment of the invention is suitable for transmitting data for eight switches. Other configurations could be utilized to transmit a higher number of switch settings.

The interface 20 for driving the transmission line 22 is depicted in more detail in FIG. 4. The output 18a from the multiplex unit 60 is coupled to a NAND gate 130 that inverts the output from the multiplex unit 60. Thus, a high output from the multiplex unit 60 is converted to a low signal at an output from the NAND gate 130. The output from the NAND gate 130 is coupled through a resistor 132 to a transister 134. A twelve volt signal to power the interface circuit 20 as well as the multiplex circuits 30, 32, 34, 36, 50, 60 originates at the polling device 14 and is transmitted via the transmission line 22 which in a preferred embodiment comprises a twisted pair of conductors. One of these conductors 22a is grounded and the second 22b transmits the twelve volt signal.

A capacitor 136 coupled across the 12 volt signal and ground serves as an energy storage device and provides a relatively constant 12 volt signal to the multiplex circuits. The output from the NAND gate 130 coupled to a base of the transistor 134 selectively turns on and off that transistor. When the transistor is turned on, the voltage at the emitter drops and a low output signal is transmitted through the transmission line to the polling device 14. The presence of a blocking diode 150 between the emitter of the transistor 134 and the capacitor 136 leaves the capacitor charged during these periods of transistor turn on to provide operating voltages to the multiplex circuits. In this way, a need for a separate power supply, other than the power supply at the polling device is avoided.

The data transmission is a serial bit stream that conforms to a particular protocol. A conventional RS-232 port at the polling device receives a serial data transmission and the polling device is programmed to monitor the receipt of data and to interpret the data stream. If the polling device incorrectly interprets a low data bit as a start bit use of the extended stop bit (data segments 4-8) avoids errors in data transmission. The polling device checks for the end of data bit. If the polling device receives a high bit where the end of data bit should be, it knows to ignore this switch data since what was assumed to be a start bit was actually either switch setting data or switch designation data.

A bit stream corresponding to the FIG. 5 bit stream continually appears at the output 18a and it is up to the polling device to determine the multiple switch settings and utilize this data in calculations and/or programmable control operations.

It will be understood that the above specific descriptions and drawings have been given for the purposes of illustration only and that variations, modifications, and other combinations of the illustrations and specifications herein described can be made by those skilled in the art without departing from the spirit and scope of the appended claims.

I claim:

1. Apparatus for generating a communications signal corresponding to one or more switch settings comprising:

conversion means electrically coupled to a plurality of switches to monitor the switch setting of said plurality of switches and convert each of said setting into a data sequence, said data sequence including a first binary sequence corresponding to a binary output of one switch of said plurality of switches and a second binary sequence designating said one switch;

said conversion means including a control input to control transmission of data from an input of said conversion means to an output of said conversion means;

timing means to coordinate a timing of data transfer from the conversion means input to its output; and control means having a clock input coupled to the timing means and a control means output responsive to the clock input, said control means output coupled to the conversion means to direct said conversion means to generate a start bit, a binary data sequence corresponding to the switch settings, and an end of data signal, said switches through said switch multiplexer.

2. The apparatus of claim 1 additionally comprising a communications path interface coupled to the conversion means output, said communications path interface including an energy storage device coupleable to the communication path to receive an energization signal from said communications path and further including a communications path driver for transmitting the data sequence along said communications path.

3. A method for converting each of the outputs of a plurality of switches into a plurality of serial bit patterns each of which corresponds to one of said switch outputs comprising the steps of:

generating a multiple bit switch signal representing a setting of a selector switch and a switch designation bit pattern to indicate to which of said plurality of switch settings said multiple bits correspond;

indicating a beginning of a data transmission by transmitting a start signal to a receiver along a serial communications path;

transmitting each of said multiple bits on said communications path to said receiver;

transmitting an end of data bit on said communications path to said receiver; and sending an extended stop signal on said serial communications path to said receiver.

4. Commuinications apparatus comprising:

(a) a plurality of selector switches that can be set to multiple switch settings;

(b) multiplex means coupled to said plurality of switches to transfer one or more binary signals corresponding to a single switch setting to a multiplex means output;

(c) counter means having a clock and a digital counter, said digital counter having a multiple bit output to indicate a counter state, a certain first group of bits of said multiple bit output being used as switch designating bits; and (d) output means having a multiple bit input organized into two groupings, a first grouping coupled to said multiplex means output and a second grouping coupled to the switch designating bits of said counter, said output means including control inputs coupled to the counter output to generate a start bit, a switch data sequence, a switch designating sequence, an end of data bit, and an extended stop bit of a sufficient length to insure that a validation of the initial received data occurs.

* * * * *

UNITED STATES PATENT AND TRADEMARK OFFICE
CERTIFICATE OF CORRECTION

PATENT NO. : 4,768,030

DATED : August 30, 1988

INVENTOR(S) : William L. Frederich

It is certified that error appears in the above-identified patent and that said Letters Patent is hereby corrected as shown below:

In Claim 1, line 28, between "said" and "switches, insert the following:

--conversion means comprising a switch multiplexer having multiplex control inputs coupled to the control means output to direct transmission of binary outputs from said--.

Signed and Sealed this

Third Day of April, 1990

Attest:

HARRY F. MANBECK, JR.

Attesting Officer

Commissioner of Patents and Trademarks